3,161,618
HIGH-IMPACT ALKYD RESINS MODIFIED WITH TRIETHYLENE GLYCOL

Robert W. F. Kreps, Geert C. Vegter, and Feije H. Sinnema, all of Amsterdam, Netherlands, assignors to Shell Oil Company, New York, N.Y., a corporation of Delaware
No Drawing. Filed Mar. 14, 1961, Ser. No. 95,496
Claims priority, application Netherlands, Apr. 20, 1960, 250,691
6 Claims. (Cl. 260—75)

The present invention relates to a novel process for preparing chemical-resistant alkyd resins, and more particularly the invention relates to improvements in alkyd resins obtained by reacting esters of alpha-alkyl monocarboxylic acids containing an epoxy group in the alcoholic part of the ester or molecule with polybasic carboxylic acids or anhydrides thereof.

The above-mentioned esters are of greatly varying types both as regards the alcoholic part of the ester molecule and the monocarboxylic acid from which they are derived. However, the ester linkage represents a weak point and thus reduces its stability. Therefore, although it is possible to utilize a wide variety of fatty acids by incorporating them into the completed alkyd resin, the disadvantage of stability has been present together with the advantages of desired oil length, increased flexibility, and the like. It has been found that increased stability is obtained when alpha-alkyl carboxylic acids are utilized and that particularly stable ester linkages are obtained with alpha-alpha-dialkyl carboxylic acids.

It has also been found that epoxy esters of alpha-alkyl carboxylic acids are paritcularly suitable because of improved reaction control whereby undesirable side reactions are minimized. Such resins and the process for making such resins are more fully explained in the copending United States patent application Serial No. 29,165, filed May 16, 1960, by Nantko Kloos. An improvement in the said process has now been found which provides products having a higher impact strength while the chemical resistance and a sufficient hardness is retained.

The improvement is attained by incorporating into the reaction mixture containing polybasic carboxylic acids or anhydrides thereof and epoxy alkyl esters of the said monocarboxylic acids, one or more polyhydroxy compounds containing hydroxyl groups which are separated by at least four atoms in the chain connecting them. Polyhydroxy compounds are preferably used which contain at least one pair of carbon atoms directly bound to hydroxyl groups, which pair is mutually linked by a chain of which no atom is directly linked to a hydroxyl group. The latter chain comprises at least two and preferably at least three atoms. The expression polyhydroxy compounds also covers dihydroxy compounds.

Suitable polyhydroxy compounds for the object of the invention are polyalkylene glycols such as polyethylene glycols. Particularly suitable are triethylene glycol and diethylene glycol; alkane polyols, such as pentane diols, especially the 1,4-isomer; hexane diols such as 1,6-hexane diol, and hexane triols such as 1,2,6-hexane triol; polyhydroxy compounds of a mixed aliphatic/aromatic structure, such as di(hydroxyalkoxy) benzene, sulphur-containing compounds such as polyhydroxy-polyalkylene polysulphides, and compounds containing sulphoxy groups, such as polyhydroxy polyalkylene sulphoxides. The polyhydroxy compounds may be either branched or unbranched.

The improvement in the impact strength is presumably due to the fact that the flexible polyhydroxy compounds (as defined above) participate in the formation of the main chain, thereby increasing the average distance between the side chains.

The effect of the polyhydroxy compounds as defined above is considerable, particularly if the starting materials used are epoxy alkyl esters of the saturated monocarboxylic acids in which the carboxyl group is bound directly to a tertiary or quaternary carbon atom. This carbon atom may or may not be part of a naphthene ring.

The monocarboxylic acids used to make the epoxy esters are generally aliphatic monocarboxylic acids, particularly those having at least 4 and not more than 20 carbon atoms in the molecule are important. Cycloaliphatic or aromatic monocarboxylic acids may also be used. The important characteristic is that the acids have secondary or tertiary carboxyl groups.

Preferably these acids are obtained by reacting with carbon monoxide and water, olefins having at least 3 carbon atoms in the molecule. This reaction takes place under the influence of acid catalysts, for example, phosphoric acid, sulphuric acid, and complexes of phosphoric acid with boron fluoride. The reaction is more thoroughly described in the copending patent application of Marinus J. Waale and Johan M. Vox, Serial No. 858,609, filed December 10, 1959, now U.S. 3,059,004, issued October 16, 1962. As indicated in this application, the carboxyl group adds on at the double bond and even when the double bond is terminal, the addition is such that a strong tendency for tertiary groups to be formed by isomerization. Branching at the double bond also provides a tertiary carboxyl group. Very attractive products are obtained when mono-olefins having at least 8 and not more than 18 carbon atoms in the molecule are thus converted into monocarboxylic acids and subsequently via the epoxy alkyl esters of these acids into alkyd resins. Preferably, more than 10% of the monocarboxylic acids will be tertiary in the carboxyl group.

The epoxy alkyl esters of the above monocarboxylic acids may be prepared in any of the known ways for obtaining epoxy esters from monocarboxylic acids. A preferred method for preparing such esters is set forth in a copending United States patent application of Nantko Kloos and Jacques J. J. Drost, Serial No. 28,865, filed May 13, 1960.

Briefly speaking, a monocarboxylic acid salt (for example, alkali metal salts or quaternary ammonium salt) may be reacted with epichlorohydrin. This reaction is preferably carried out by gradually adding a liquid phase consisting of epichlorohydrin or containing the latter in a stream of a concentrated solution of the salt in water, or by gradually adding a concentrated solution of an alkali metal hydroxide to a liquid phase containing both epichlorohydrin and a monocarboxylic acid. The water supplied and any water formed during the reaction may be removed by azeotropic distillation. According to another process, a dry salt of a carboxylic acid is suspended in a liquid phase consisting of or containing epichlorohydrin. Tertiary amines and quaternary ammonium salts may act as catalysts in this reaction.

Monocarboxylic acid may also be reacted as such with epichlorohydrin with the use of nitrogen bases or salts thereof as catalysts. When monocarboxylic acids and epichlorohydrin are used in a stoichiometric ratio, or when an excess of dicarboxylic acid is used, a chlorohydrin is formed from which a glycidyl ester may be produced by treating with alkaline substances such as alkali metal hydroxides. If epichlorohydrin is reacted with a monocarboxylic acid in a mole ratio of at least 2:1, the glycidyl ester is immediately formed. In this case, the preferred catalysts are tertiary amines and quaternary ammonium salts.

Monocarboxylic acid salts may also be reacted with chlorohydrin. An ester is then obtained from which the desired glycidyl ester may be formed by treating with an alkaline substance. Homologues and coresponding bromine compounds may be used in the described processes instead of epichlorohydrin and chlorohydrin.

Although among the epoxy alkyl esters the glycidyl esters are the most important for the present process, use may suitably be made of esters in which the molecule contains a different epoxy alkyl group, for example, 2,3-epoxybutyl, 3,4-epoxybutyl, 2,3-epoxyhexyl, 2,3-epoxy-4-phenyloctyl, 1-ethyl-2,3-epoxyhexyl, 2,3-epoxy-4,5-diethyldodecyl and epoxycyclohexyl.

Illustrative examples of polybasic carboxylic acids that may be used to prepare the alkyd resins of this invention include malonic acid, succinic acid, glutaric acid, adipic acid, azelaic acid, sebacic acid, maleic acid, fumaric acid, phthalic acid, tetrahydrophthalic acid; isophthalic acid, terephthalic acid, hexahydrophthalic acid, diglycolic acid and dimerized fatty acids of drying oils such as soyabean oil. Examples of suitable dicarboxylic acid anhydrides are those of succinic acid, glutaric acid, maleic acid, phthalic acid, tetrahydrophthalic acid and hexahydrophthalic acid, as well as Diels-Alder adducts of maleic anhydride with various dienes such as terpenes and cyclopentadiene.

The temperature during the production of alkyd resins is generally in the range of from 140° to 270° C, but in exceptional cases it is occasionally outside this range.

The proportions of polybasic carboxylic acid used will be related to the hydroxyl content with the epoxy ester considered as hydroxyl for this purpose, and added glycerine or the like is also included. Thus the ratio of acid to base will be such that there will be from about 1 to about 1.3 hydroxyl groups per carboxylic acid group. Stated another way, the equivalent weight of the hydroxyl or alcohol components will be from about 1 to about 1.3 times the equivalent weight of the carboxylic acid components.

In order to accelerate the reaction there may be incorporated into the reaction mixture alkalis, such as alkali metal hydroxides and strong organic bases, for example, quaternary ammonium bases, amines, particularly tertiary amines, phosphoric acid, sulphonic acids, Friedel-Crafts catalysts (Lewis acids) such as $BF_3$, if desired in the form of a complex, for instance, with an ether or an amine, and also all other substances known as catalysts for this type of reactions. If desired, a solvent may be present during the reaction and inert solvents in particular, such as xylene and benzene, are suitable.

To ensure that the alkyd resins have the lightest possible color, it is advisable to carry out the reaction in an oxygen-free atmosphere.

In particular when the polyhydroxy compounds, as defined above, contain only two hydroxyl groups alkyd resins having excellent properties are obtained according to the invention when in addition to one or more of the said polyhydroxy compounds one or more polyols having three or more hydroxyl groups are present during the reaction. Examples of such polyols suitable for use are glycerol, pentaerythritol, pentane and hexane triols and trimethylol propane.

The best results are obtained by carrying out the reaction in the presence of the following combinations:

Triethylene glycol_____ Glycerol.
1,5-pentane diol_____ Glycerol.
1,6-hexane diol_____ Glycerol.
Triethylene glycol_____ Trimethylol propane.
Triethylene glycol_____ Pentaerythritol.
Diethylene glycol_____ Glycerol.

The alkyd resins produced according to the invention are worked up by the conventional methods to paints, lacquers and varnishes, while components such as pigments, diluents, dryers, phenolformaldehyde, urea formaldehyde or melamine formaldehyde resins may be added if desired.

*Example I*

The starting materials were alkenes having from 8 to 10 carbon atoms in the molecule. They were obtained as a fraction of a product formed in the thermal vapor-phase cracking of a paraffinic feedstock in the presence of steam. The dienes originally present in this fraction were converted into monoolefins by partial hydrogenation. The alkenes were substantially unbranched. The double bonds were present almost exclusively between non-terminal carbon atoms.

The alkenes were converted with carbon monoxide and water into carboxylic acids, the temperature being 60° C., the carbon monoxide pressure 100 atmospheres, a catalyst being used containing $H_3PO_4$ and $BF_3$ in equimolar quantities. The crude carboxylic acids were neutralized with sodium hydroxide after being separated from the catalyst, whereupon the aqueous sodium salt solution was freed from the hydrocarbons still present by finally extracting it with gasoline.

The sodium salt solution was gradually added to a tenfold molar quantity of epichlorohydrin, the mixture being maintained at the boiling point and water removed by azeotropic distillation. In this way, glycidyl esters of alpha-alkyl monocarboxylic acids having 9 to 11 carbon atoms were obtained.

61.5 grams of the glycidyl ester were mixed under an oxygen-free nitrogen blanket with 23 grams of glycerol, 37.5 grams of triethylene glycol, 111 grams of phthalic anhydride and 24 grams of xylene. The mixture was gradually brought to 190° C. with stirring and kept at this temperature for half an hour, the evaporated xylene being condensed and returned to the reaction vessel. Part of the xylene obtained as condensate was then removed and the temperature was increased to 240° C. The water formed during the reaction was azeotropically distilled along with xylene. After the temperature had been maintained at 240° C. for 3¼ hours the product was cooled and diluted with xylene to a 50% solution. This solution was mixed with formaldehyde resin (weight ratio of alkyd to urea formaldehyde resin=70:30). The mixture was pigmented with titanium white (weight ratio of pigment: resin=0.9:1) and applied to thin steel sheets. After baking for 40 and 60 minutes respectively at 150° C., the films had the following properties.

| | Baking period 40 minutes | Baking period 60 minutes |
| --- | --- | --- |
| Pencil hardness | 5 H | 5 H |
| Hardness (Buchholz) | 111 | 111 |
| Impact strength (inch/lb.) | 50 | 50 |
| Flexibility, bend testing around a mandrel having a diameter of | 1/16 inch | 1/8 inch |

The impact strength was determined according to British Standards. A steel ball ¾ inch in diameter, loaded to 2 lbs., was dropped from an adjustable height onto a 1 mm. thick plate of cold rolled steel, the bottom of which was coated with a lacquer layer 30 mmu thick and supported on all sides around the point of impact by a ring having an inside diameter of 1 inch.

*Example II*

Glycidyl ester, prepared as in Example I above, phthalic anhydride and glycerol are mixed in a molar ratio of 0.555, 1.00 and 0.45, respectively, and reacted in accordance with the procedure of Example I above. The resin thus obtained had an oil length of 35, an acid value of 6.0, and an OH content of 0.125 equivalence per 100 grams. The resin was mixed with urea formaldehyde in a rate ratio of alkyd to urea aldehyde of 70:30 and pigmented with titanium white in a ratio of 0.9 part pigment to 1 part resin, as was done in Example I above.

The paint thus obtained was applied to thin steel sheets and baked for 30 minutes at 150° C. The films had the following properties:

Pencil hardness _____ 4 H
Hardness (Bucholz) _____ 118
Impact strength (inch/lb.) _____ 5
Flexibility, bend testing around a mandrel having a diameter of ⅛ inch.

The table above graphically illustrates that where the glycol of the present invention was omitted, an impact strength of only 1/10 of that obtained by the present invention was found. Thus, the two examples illustrate that an unexpectedly large increase in impact strength is obtained by the present invention.

We claim as our invention:

1. A process for preparing alkyd resins which comprises mixing together and simultaneously reacting (1) glycidyl esters of saturated alpha-alkyl monocarboxylic acids prepared by reacting epichlorohydrin with alpha-alkyl monocarboxylic acids, said acids containing from 4 to 20 carbon atoms and prepared by reacting an olefin with carbon monoxide and water in the presence of acid catalysts, (2) a member of the class consisting of polycarboxylic acids and polycarboxylic acid anhydrides and (3) at least two polyols wherein at least one contains two hydroxyl groups on a carbon chain in which at least four carbon atoms separate the two hydroxyl groups and the other polyol has at least three hydroxyl groups, the former being present in sufficient amount to provide a substantial improvement in impact strength of the resulting resin.

2. A process for preparing alkyd resins which comprises mixing together and simultaneously reacting (1) glycidyl esters of saturated alpha-alkyl monocarboxylic acids prepared by reacting epichlorohydrin with alpha-alkyl monocarboxylic acids, said acids containing from 9 to 11 carbon atoms and prepared by reacting an olefin with carbon monoxide and water in the presence of acid catalysts, (2) phthalic anhydride, (3) triethylene glycol and (4) glycerine wherein the molar ratio of (3) to (4) is approximately 1:1.

3. A process as in claim 1 wherein the alpha-alkyl monocarboxylic acid contains from 9–11 carbon atoms in the molecule.

4. A process as in claim 1 wherein one polyol is triethylene glycol.

5. A process as in claim 1 wherein one polyol is pentane diol.

6. A process as in claim 1 wherein one polyol is a hexanediol.

References Cited by the Examiner
FOREIGN PATENTS
569,634    1/59    Canada.

L. J. BERCOVITZ, *Primary Examiner.*

L. BURSTEIN, *Examiner.*